(No Model.)
W. B. THOMPSON.
COFFEE MILL.
No. 507,051. Patented Oct. 17, 1893.
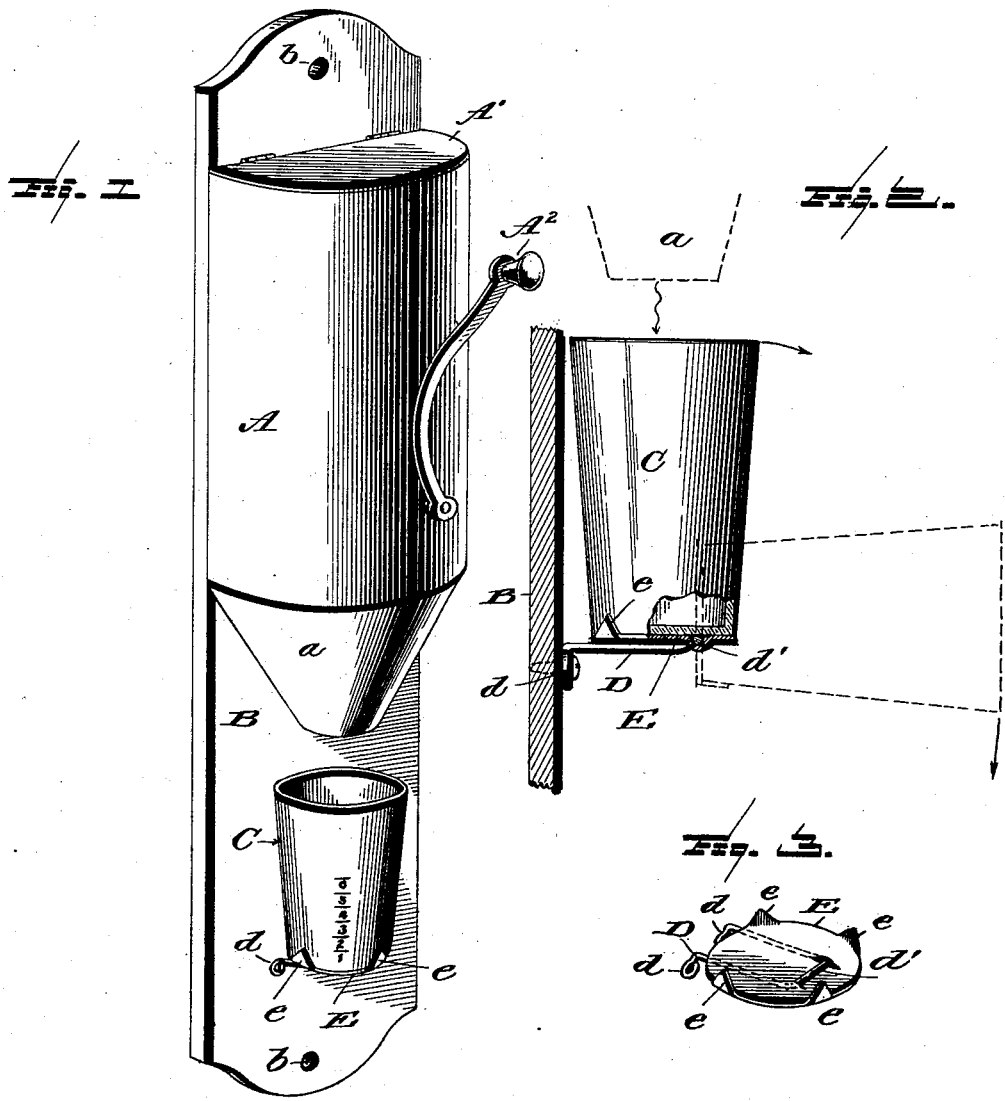
Witnesses
L. C. Hill.
E. H. Bond
Inventor:
Walter B. Thompson,
By E. B. Stocking
Attorney

UNITED STATES PATENT OFFICE.

WALTER B. THOMPSON, OF EMPORIUM, PENNSYLVANIA, ASSIGNOR OF ONE-HALF TO FRANK X. BLUMLE, OF SAME PLACE.

COFFEE-MILL.

SPECIFICATION forming part of Letters Patent No. 507,051, dated October 17, 1893.

Application filed June 15, 1893. Serial No. 477,700. (No model.)

*To all whom it may concern:*

Be it known that I, WALTER B. THOMPSON, a citizen of the United States, residing at Emporium, in the county of Cameron, State of Pennsylvania, have invented certain new and useful Improvements in Coffee-Mills, of which the following is a specification, reference being had therein to the accompanying drawings.

This invention relates to certain new and useful improvements in coffee mills of that class which are designed to be affixed in any desired position upon a wall or other support, and it has for its object among others to provide a simple, cheap, yet convenient mill, which has for use in connection therewith a pivoted receptacle for catching the ground coffee as it comes from the mill, the said receptacle being graduated and supported upon a pivoted part so mounted as to throw the preponderance of weight toward the support so as to prevent accidental tipping of the receptacle to the front, yet allowing the same to be brought to a substantially horizontal position when it is desired to empty the same of its contents. The mill and the receptacle are carried by a board or other support which is designed to be readily secured in any desired position, either permanently or detachably. The convenience of such a device will be readily appreciated and its cheapness of manufacture will place it within the means of every household.

Other objects and advantages of the invention will hereinafter appear and the novel features thereof will be specifically defined by the appended claim.

The invention is clearly illustrated in the accompanying drawings, which, with the letters of reference marked thereon, form a part of this specification, and in which—

Figure 1 is a perspective view of my improvement. Fig. 2 is an enlarged detail, partly in section and partly in elevation, showing the manner of supporting the graduated receptacle, with a portion broken away. Fig. 3 is a perspective view of the receptacle-support detached.

Like letters of reference indicate like parts throughout the several views.

Referring now to the details of the drawings by letter, A designates a coffee mill of any well known or approved form, the inclosing case of which is substantially semi-circular in cross section, provided with a hinged cover A' and a tapered lower end or discharge portion $a$.

$A^2$ is the crank handle.

This mill may be secured in any desired position in any suitable manner, preferably by being affixed to a strip or board B which may be as ornamental as may be desired and which is provided at one or both ends with a hole $b$ to receive its securing means or by which it may be hung upon a hook or peg, detachably if desired.

C is a cup or receptacle, preferably provided with graduations as shown in Fig. 1 by which any desired quantity can be measured, such as one, two or more teaspoonfuls or tablespoonfuls, of the ground coffee may be readily determined. This cup or receptacle is designed to be supported beneath the tapered discharge end of the mill so as to receive the coffee as the latter is ground; in this instance it is shown as supported upon a support which is affixed to the strip or board B, but if the coffee mill is affixed to the wall or other support the cup or receptacle will be likewise supported; it is preferred however to have the mill and cup or receptacle affixed to a strip or board so that the whole may be easily affixed in any desired position.

The cup or receptacle C is supported upon the disk or plate E which has a plurality of upwardly-extending portions or lugs $e$ which are designed to embrace the lower portion of the cup or receptacle and which should be so proportioned and arranged as to firmly hold the cup and prevent its displacement when turned into its horizontal position; it may be cemented to the disk if necessary. This disk is pivotally mounted upon the wire D which has its ends connected to or secured to the strip or board B in any suitable manner, as by having its ends formed into eyes $d$ through which pass the means by which it is secured in place. This wire has two substantially parallel portions arranged beneath the disk or support E and a transverse portion or cross-bar $d'$ which is pivotally supported in or connected with the disk as by being passed through openings therein as seen in Fig. 3, the disk being depressed to receive the cross-bar as shown in Fig. 2. The connection of this cross-bar with the disk is considerably forward of the center of the disk as seen in Figs. 2 and 3 so that the normal tendency of the disk to lie horizontally and when the cup or receptacle is thereon the latter will be supported in such a manner as to throw the center of gravity to the rear of the center and thus guard against any inclination to tip forward especially when it contains any amount of material.

The manner of use will be apparent. The cup is placed in its upright position where it is held against any liability of accidental tipping forward; the coffee is placed in the mill and ground and the desired amount being received in the cup or receptacle C the latter is tipped forward as indicated by dotted lines in Fig. 2 and the coffee therein emptied into the coffee pot or other vessel when the cup is returned to its normal position ready to receive another lot of coffee from the mill.

What I claim as new is—

The combination with a support, of a plate with receptacle-holding portions, and a wire having its ends secured to said support with its cross portion pivotally connected with the plate forward of its center, as set forth.

In testimony whereof I affix my signature in presence of two witnesses.

WALTER B. THOMPSON.

Witnesses:
R. M. OVERHISER,
M. P. WHITING.